United States Patent
D'Angelo et al.

(10) Patent No.: US 11,519,256 B1
(45) Date of Patent: Dec. 6, 2022

(54) METHOD FOR LONG-HORIZON EVENT-BASED DETECTION OF POOR HOLE CLEANING CONDITIONS FOR USE IN STREAMING ANALYTICS AT THE DRILLING RIG

(71) Applicant: INTELLICESS INC., Austin, TX (US)

(72) Inventors: John James D'Angelo, Austin, TX (US); Pradeepkumar Ashok, Austin, TX (US)

(73) Assignee: Intellicess Inc., Austin, TX (US)

(*) Notice: Subject to any disclaimer, the term of this patent is extended or adjusted under 35 U.S.C. 154(b) by 13 days.

(21) Appl. No.: 16/775,839

(22) Filed: Jan. 29, 2020

Related U.S. Application Data

(60) Provisional application No. 62/800,671, filed on Feb. 4, 2019, provisional application No. 62/800,672, filed on Feb. 4, 2019.

(51) Int. Cl.
| | |
|---|---|
| *E21B 44/00* | (2006.01) |
| *G06F 17/18* | (2006.01) |
| *E21B 47/12* | (2012.01) |
| *E21B 47/022* | (2012.01) |
| *E21B 37/00* | (2006.01) |

(52) U.S. Cl.
CPC ............. *E21B 44/00* (2013.01); *E21B 37/00* (2013.01); *E21B 47/022* (2013.01); *E21B 47/12* (2013.01); *G06F 17/18* (2013.01)

(58) Field of Classification Search
CPC ........ E21B 44/00; E21B 47/022; E21B 47/12; E21B 2200/22; E21B 37/00; G06F 17/18
See application file for complete search history.

(56) References Cited

U.S. PATENT DOCUMENTS

| | | | | |
|---|---|---|---|---|
| 5,316,091 | A * | 5/1994 | Rasi ................ | E21B 31/03 175/61 |
| 2006/0293872 | A1* | 12/2006 | Zamora ............ | E21B 47/002 703/10 |
| 2008/0007423 | A1* | 1/2008 | Krueger ........... | E21B 47/18 340/854.5 |
| 2015/0211350 | A1* | 7/2015 | Norman ........... | E21B 21/00 700/275 |
| 2018/0171774 | A1* | 6/2018 | Ringer ............. | E21B 47/024 |
| 2018/0298746 | A1* | 10/2018 | Short ............... | E21B 19/008 |

* cited by examiner

*Primary Examiner* — Tarun Sinha
*Assistant Examiner* — Yossef Korang-Beheshti
(74) *Attorney, Agent, or Firm* — Avek IP, LLC

(57) ABSTRACT

A method for estimating the efficiency of hole cleaning of a well-bore during drilling operations includes (a) selecting at least one feature of the drilling operation for monitoring; (b) receiving, from a sensor, data regarding the at least one feature; (c) comparing the data to a predetermined condition for the at least one feature; (d) defining an event when the data meets the predetermined condition; (e) assigning a weight to the event based on a duration of the event; and (f) estimating an efficiency of the hole cleaning based on the event and the weight of the event. The at least one feature being selected from the list consisting of: hole angle, circulation, tight spot, static hole, and bit hydraulics.

9 Claims, 11 Drawing Sheets

METHOD FOR LONG-HORIZON EVENT-BASED DETECTION OF POOR HOLE CLEANING CONDITIONS FOR USE IN STREAMING ANALYTICS AT THE DRILLING RIG

CROSS-REFERENCE TO RELATED APPLICATIONS

This application claims the benefit of U.S. Provisional Application No. 62/800,671 and U.S. Provisional Application No. 62/800,672, both filed Feb. 4, 2019, the disclosures of which are incorporated by reference herein in their entireties.

FIELD OF THE INVENTION

This invention is related to methods for recording and analyzing down hole drilling operations, and specifically the efficiency of hole cleaning operations, in real time.

SUMMARY OF THE INVENTION

The following presents a simplified summary of the invention in order to provide a basic understanding of some aspects of the invention. The summary is not an extensive overview of the invention. It is not intended to identify critical elements of the invention or to limit the scope of the invention. Its sole purpose is to present some concepts of the invention in a simplified form as a prelude to the more detailed description presented below.

In one embodiment, a method for estimating the efficiency of hole cleaning of a well-bore during drilling operations includes (a) selecting at least one feature of the drilling operation for monitoring; (b) receiving, from a sensor, data regarding the at least one feature; (c) comparing the data to a predetermined condition for the at least one feature; (d) defining an event when the data meets the predetermined condition; (e) assigning a weight to the event based on a duration of the event; and (f) estimating an efficiency of the hole cleaning based on the event and the weight of the event. The at least one feature being selected from the list consisting of: hole angle, circulation, tight spot, static hole, and bit hydraulics.

In another embodiment, a method for estimating the efficiency of hole cleaning of a well-bore during drilling operations includes generating a display for each of a plurality of features, the features being selected from the list consisting of: static hole, bit hydraulics, tight spot, circulation rating, pipe rotation, working pipe, and circulating no drilling. For each feature of the plurality of features, the method includes: (a) receiving data from a sensor; (b) determining if the data meets a predetermined condition; (c) if the data meets the predetermined condition, logging an event; (d) logging a time-stamp associated with the event; (e) assigning a weight to the event; and (f) determining a probability that the feature exhibits a satisfactory state or an unsatisfactory state based on the weight of the event. Finally, an efficiency of the hole cleaning is estimated based on the probability of each feature of the plurality of features.

In still another embodiment, a system for monitoring the efficiency of hole cleaning of a well-bore during drilling operations includes a computing device having a processor in data communication with a plurality of sensors and computer memory. The computer memory ha instructions that, when effected by the processor, perform the following steps: (a) receive, from at least one of the sensors, data relating to at least one feature for monitoring; (b) determine if the data from the at least one sensor meets a predetermined condition for the at least one feature; (c) if the data meets the predetermined condition, log an event, the event being associated with the at least one feature and having a time-stamp; (d) assign a weight to the event; (e) determine a probability that the feature associated with the event exhibits a satisfactory state or an unsatisfactory state; and (f) estimate an efficiency of the well cleaning operations based on the probability of the feature.

DETAILED DESCRIPTION

The condition of the wellbore is a high priority during drilling operations. However, getting a perfect representation of the wellbore conditions in real-time is a task that has eluded researchers for decades. Hole cleaning is of particular importance when considering the condition of the wellbore. Drilling into the earth produces debris commonly referred to as "cuttings," which range in size, shape, and material properties depending on the conditions of the formation. During the drilling process, drilling fluid is circulated through the drill string, across the bit nozzles, and up through the annulus of the wellbore. This fluid serves many purposes, one of which is to remove cuttings from the wellbore and deliver them up to the surface. This process is known as hole cleaning, and its efficacy is a complex problem involving the transport and accumulation of the cuttings along the wellbore.

Figure 1:
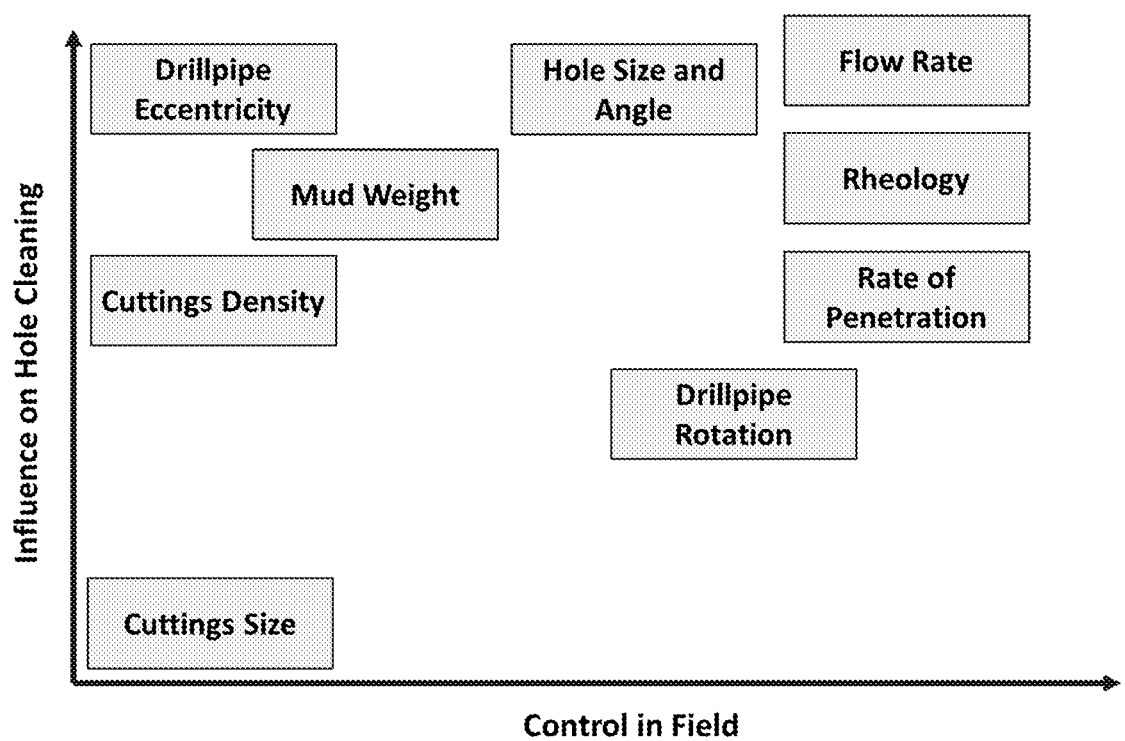
FIG. 1 is a graphical illustration of the estimated impact of key variables on hole cleaning process as a function of the ability to control the variable in the field.

There are numerous factors that impact the transport of cuttings. FIG. 1 is an illustration of the estimated impact of some of the parameters on the hole cleaning process as a function of how much they can be controlled in the field. As the illustration shows, variables such as drill pipe eccentricity, cuttings density, and mud weight have a relatively significant influence on the hole cleaning process but are not easily controlled in the field. Other variables such as flow rate, rheology, and rate of penetration significantly influence the hole cleaning process and can be more easily controlled in the field.

Regardless, if hole cleaning is not effective and cuttings are allowed to accumulate along the wellbore, numerous problems can ensue. Accumulation of cuttings near the bit can reduce the transfer of weight onto the bit and the rate of penetration. Cuttings can also accumulate in beds along the formation which can increase drag along the drill string and potentially catch the drill string during trips out of the hole. This can result in the drill string getting stuck in the hole which is a time-consuming issue to remedy and could necessitate a costly plug and sidetrack. Cuttings beds can be difficult to predict and remedy, but are a constant concern in highly deviated wells.

The literature on hole cleaning considers both empirical and mechanistic methods that attempt to quantitatively capture the individual and combined impact of the various parameters shown in FIG. 1 on the hole cleaning process. Empirical methods attempt to do this by fitting to experimental data, and predicting a critical circulation rate to hopefully prevent the accumulation of cuttings. Mechanistic methods try to model the physical principles at play. Mechanistic models exist for both instantaneous predictions, like the critical circulation rate as well as transient predictions, like the height of cuttings beds along the wellbore as a function of time. While these models have seen great improvement in the last several years, they do not always guarantee realistic results as they are subject to error in both the assumptions and inputs.

According to embodiments of the invention, a method is proposed that more accurately predicts the cleaning efficiency of hole cleaning operations over time. The method does not estimate the cuttings bed height or accumulation over time. Instead, it infers the probability that the hole cleaning operations are efficient over time. This probabilistic belief is based on features that suggest efficient or poor hole cleaning. These features are based on monitoring and examination of key events and associated properties over an extended period of time. Certain key parameters are stored which relate to the events for informing the inferences as to hole cleaning efficiency.

The event-based features utilized by the method and events associated with each feature are listed in table 1 below.

TABLE 1

| Hole Cleaning Features | |
| --- | --- |
| Feature | Event Definition |
| Insufficient Circulation | When the circulation rate falls below a threshold for longer than a set time period, it triggers an insufficient circulation event. The circulation rate threshold is the critical flow rate needed to transport cuttings. |
| Tight Spot | When tight spot events are detected during tripping operations at a high frequency, it is likely that the hole cleaning condition is poor and the potential for a stuck pipe incident is high. |
| Static Hole | When the drill string is not moving or not present for longer than a set time threshold, a static hole event is triggered. A lack of activity in the hole means that the only thing preventing cuttings from settling along the wellbore is the viscosity of the drilling fluid. This settling tendency factors into the continuous feature probability. |
| Bit Hydraulics | Insufficient hydraulic impact force for a sustained period while circulating triggers a bit hydraulics event. Hydraulic impact force is the force imposed on the |

TABLE 1-continued

| Hole Cleaning Features | |
| --- | --- |
| Feature | Event Definition |
| | formation by the drilling fluid jetting from the bit nozzles and is important in the transport of drilled cuttings. |
| Working Pipe | When pipe working is detected from the bit depth and block height data, it is expected that this will help to dislodge cuttings and improve hole cleaning. |
| Rotating Pipe | When pipe rotation is detected and drilling or connections are not taking place, it is expected this rotation is meant to dislodge cuttings and improve hole cleaning. |
| Circulating No Drilling | When fluid is circulated and drilling is not taking place, it is expected that this circulation is meant to further clean the wellbore. |

Hole angle is also monitored over time. The hole angle is a real-time feature that influences the hole cleaning efficiency. Unlike the long-horizon event-based features listed above, the hole angle is a continuously updated input to the network and does not rely on the detection of any event(s).

Figure 2:
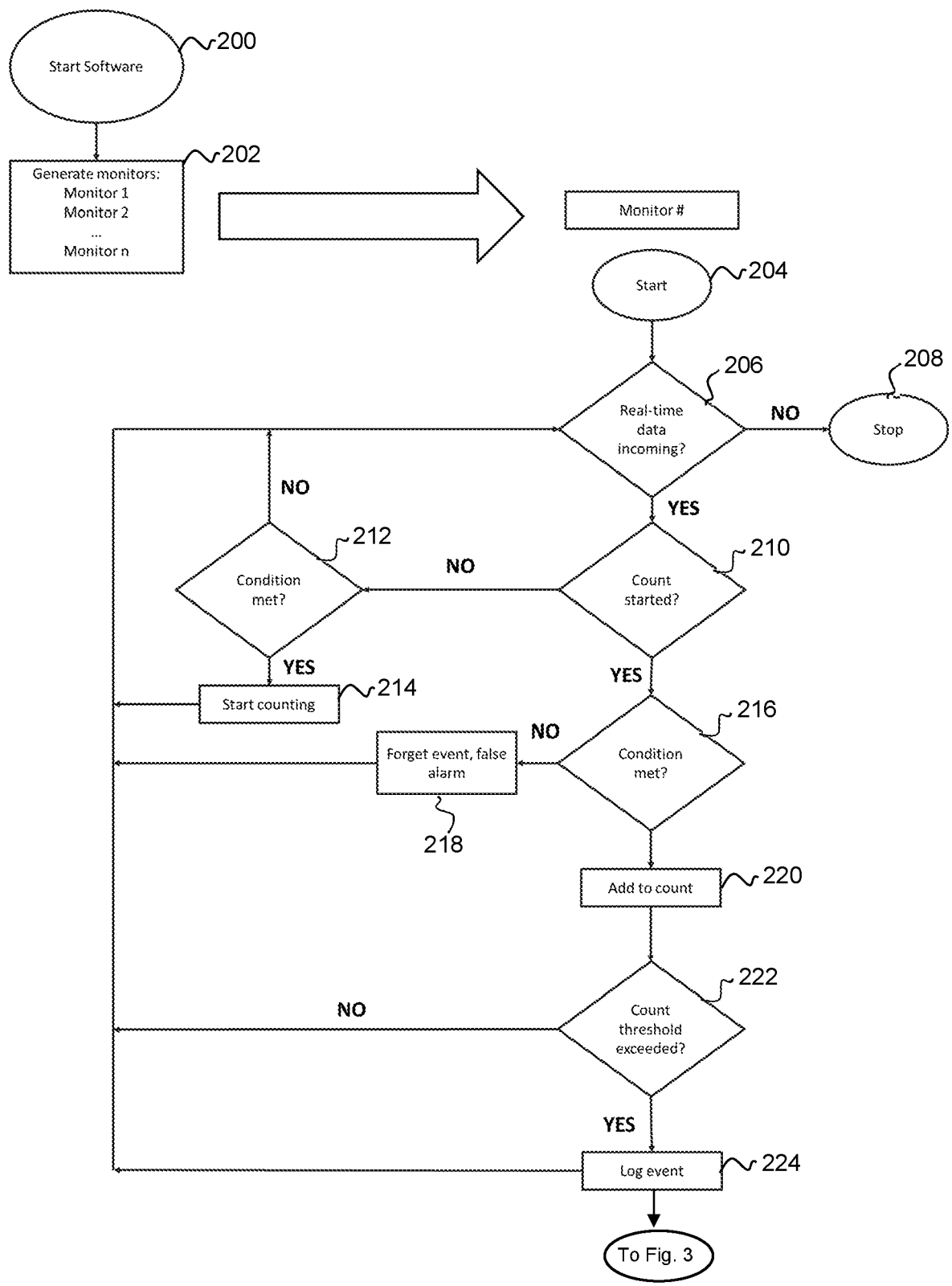
FIG. 2 is a flow chart of an exemplary hole cleaning method according to embodiments of the invention.

The flowchart in FIG. 2 illustrates how certain events are detected. The method begins at step 200, and at step 202 a series of monitoring windows are generated on a display screen to display real-time drilling data from sensors disposed about the system for a number of drilling variables. Each monitoring window may be associated with a specific event associated with the drilling variable (e.g., insufficient circulation, static hole, bit hydraulics, et cetera) that a user wishes to observe. A unique sub-program may be associated with each monitoring window to review the drilling data from the sensors to determine the presence of the specific event. The sub-programs may operate as part of the larger overall program which defines the hole cleaning efficiency for the entire drilling operation based on event duration and frequencies. In some embodiments, the programming receives all real-time drilling data from all sensors and determines which data is necessary to make an event determination for the specific event for each monitoring window. Alternatively, an individual program may be associated with each monitoring window, and the programming for that monitoring window may receive data from only the sensors that provide information necessary to make the event determination for that monitoring window.

Regardless, in general, the programming for each monitoring window begins at step 204. At step 206, the programming determines whether real-time drilling data is incoming from the sensors. If no data is incoming, then the programming stops at step 208. If data is incoming, then the process moves to step 210.

At step 210, the programming determines whether data has previously been received that suggests a possible event. Because drilling takes place over time, and because it is difficult to effectively monitor and control the drilling process from above ground, it is possible (and even likely) that the sensors will detect an irregular measurement. Overtime, a series of irregular measurements can be indicative of an undesirable event. However, the issue may resolve itself without above-ground intervention. If data has not previously suggested a possible event, then the programming determines whether the data meets a predetermined condition at step 212. If the data does not meet the predetermined condition at step 212, then the programming returns to step 206. If the programming determines at step 212 that the data does meet the predetermined condition, then the data is logged as a count at step 214, and the programming returns to step 206 to continue monitoring the data from the sensors.

If, at step 210, the programming determines that data has previously been logged that suggests a possible event, then the process moves to step 216. At step 216, the programming determines whether the new data meets the predetermined condition. If not, the data is discarded at step 218 and the process returns to step 206.

If at step 216 the predetermined condition is met, the data is added to the count log at step 220. Then, at step 222 the programming determines whether the count log exceeds a predetermined threshold. The predetermined threshold may be, for example, a number of count logs (e.g., three data sets that meet the predetermined condition), or a period of time (e.g., data sets meeting the predetermined condition for measurements taken over a five-minute period). If the count log does not exceed the predetermined threshold at step 222, then the process returns to step 206. If the count log does exceed the predetermined threshold at step 222, then an event determination is made, and the event is logged at step 224. The program then returns to step 206 to continue to review data in real time. Once the event is logged, steps may be taken above ground to the resolve the event.

For example, consider circulation rate as the drilling variable. At step 210 the programming determines whether the sensor has previously identified that the circulation rate has fallen below a threshold value. If not, then at step 212 the programming determines whether the current data indicates that the circulation rate is below the threshold value. If not, then the process returns to step 206 to continue to monitor the circulation rate. If so, then at step 214 a first count is logged that indicates that the circulation rate was below the threshold value, and the process returns to step 206. If at step 210 the programming determined that a count had previously been logged that indicated a low circulation rate, then the process continues to step 216, where the data is reviewed to determine if the circulation rate is now below the threshold value. If not, the data is discarded and the process returns to step 206. If the circulation is below the threshold value, then another count is logged at step 220. At step 222 the programming determines whether the count exceeds a predetermined threshold. Here, the threshold may be based on a set time period. If counts have been logged over a sufficient period of time that the threshold is exceeded, then an event is logged at step 224. In this case, the event is insufficient circulation, indicating that the flow rate of fluids in the wellbore is below the critical flow rate needed to transport cuttings from the wellbore.

Figure 3:
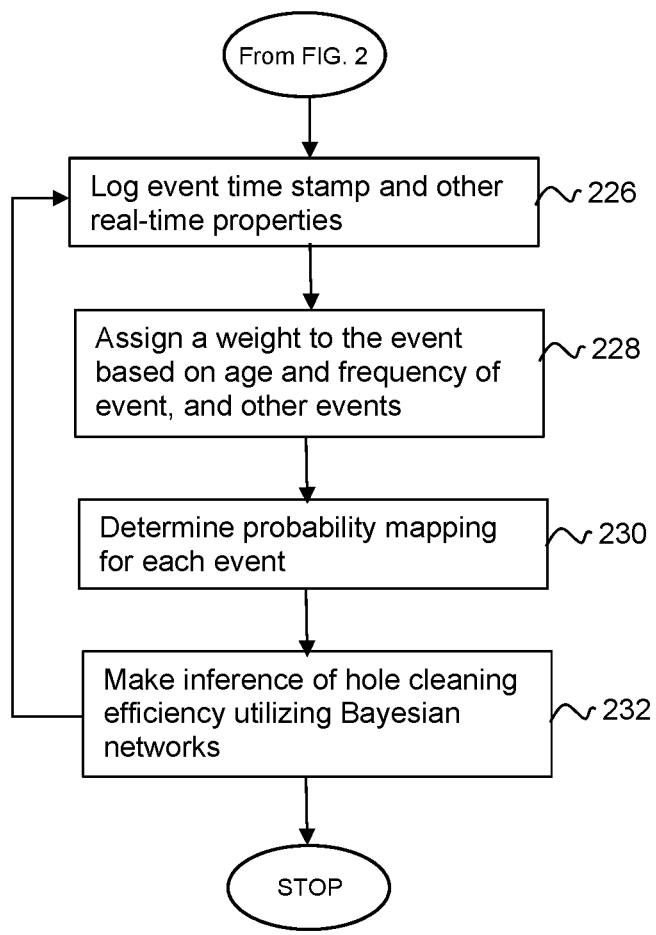
FIG. 3 is the continuation of the flow chart of FIG. 2.

Moving on to FIG. 3, when an event is logged, any real-time properties can be stored along with the event at step 226. For example, a start and end time stamp of an event may be stored to encode the event duration. A weight may then be assigned to the event based on event age and frequency at step 228. Considering the example from above, several events may be logged for insufficient circulation. Each subsequent event that is logged for insufficient circulation may be assigned a weight based on the number of such events that have occurred. Additionally, the weight assigned to the event may be influenced by other events that are logged by the software. For example, an event may be logged for a static hole, indicating that the drill string is not moving. The programming may include instructions for evaluating which of the two events (e.g., insufficient circulation and static hole) are most important to immediately address, and a higher weight may be assigned to that event. Of course, while two events are used as the example here, any number of events may be occurring at one time and may be used in the determination of which weight is assigned to which event.

Drilling fluid properties may also be stored along with an identifier to help the user determine what condition triggered the event. Within the software, the logged events may exist within a container object that may be continuously backed up (e.g., to a JavaScript Object Notation (JSON) file) at a predetermined time interval.

Events may be stored as objects instead of, or in addition to, as a count of events. This allows for flexibility by permitting various types of events with various different properties. Typically, an event will have a type, a start/end time, and some unique identification. The start/end time are important for assigning a weight to an event based on the age of the event(s). In some cases, however, more information is desired. For example, for static hole events, the rate at which cuttings settle will be dependent on the mud properties at that time (viscosity, density, etc.). In this framework, adding the properties of the drilling fluid onto a static-type event is simple, and the properties may be utilized to assign a weight to the event.

One potential issue with long-horizon event tracking is that the events are stored in application memory, meaning that if the software application crashes or restarts in the middle of a well, all the events in memory would be lost. This may be prevented according to the inventive method by backing up the event history every few minutes (e.g., every 5 minutes, 10 minutes, 20 minutes, etc.) in a JSON file. When the software restarts, it simply recollects the events from the file and continues as if the restart never happened. The JSON format can handle considerable complexity in the objects that are backed up. This allows for fast read-from/write-to ability, and also results in a backup file that can be read and understood by humans. An example of text from a backup file for a single static-type event is shown below:

{
  "startTime": "2018-12-23T10:20:17-05:00",
    "endTime": "2018-12-23T14:24:13-05:00",
    "matchID": "C157",
    "matchType": "STATIC_HOLE",
    "mudProperties": [8.25, 19.0, 9.0]
}

Figure 4:
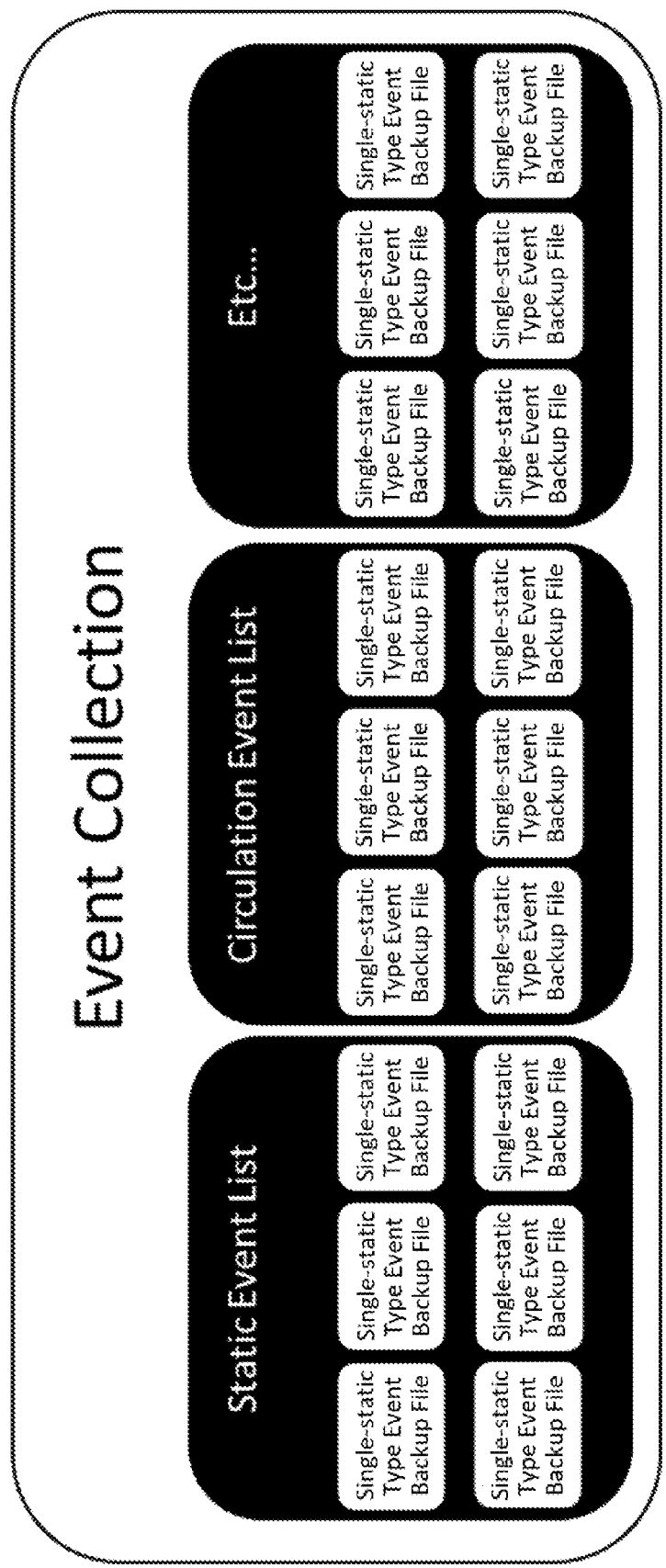
FIG. 4 is an illustration of a graphical user interface of an event organization scheme according to embodiments of the invention.

Events that are detected are stored as unique objects of a particular type. In other words, each particular type of drilling variable has a list of objects. All of these lists are stored within a central collection. This allows for efficient access to all the event types and the various properties for each drilling variable. An exemplary structure is outlined in FIG. 4, which shows a list of objects (i.e., event determinations) for particular types of drilling variables, here, static events, circulation events, et cetera. Each of the detected events are logged as an object within the group defined by the drilling variable.

Examination of key events during the drilling process enables the program to develop a belief in the hole cleaning efficiency over time. This is because the detected events are related, at least through duration and frequency, to continuous probabilistic features that can be used to infer the probability that the hole cleaning process is either efficient or poor. As noted above, the events can also be weighted based on age to ensure that current beliefs are not strongly influenced by those that are far in the past. The inference may be developed using a Bayesian network representation of the features.

Once the weight is assigned to the event in step 228, the program completes probability mapping for each event at step 230. Tables 2 and 3, below, define the probability mapping which may be used by the programming to define the hole cleaning efficiency. As described herein, each event is logged with a start and end time. The end time of each event may be utilized to determine the weight afforded to the event based on the event age ($w_{age}$). The weight is multiplied by the duration of each event when the durations are summed.

TABLE 2

Probability Mappings for each Hole Cleaning Feature

| Feature | Probability Mapping |
|---|---|
| Insufficient Circulation | $P(\text{Insufficient}) = \dfrac{\left(\sum D_{insuff} W_{age}\right)}{\left(\sum D_{insuff} W_{age}\right) + \left(\sum D_{suff} W_{age}\right)}$ <br><br> $P(\text{Sufficient}) = 1 - P(\text{Insufficient})$ |
| Tight Spot | $P(\text{Frequent}) = \dfrac{N_{alerts}}{T_{tight}}$ <br><br> $P(\text{Infrequent}) = 1 - P(\text{Frequent})$ |
| Static Hole | $P(\text{Static}) = \dfrac{(\Sigma D_{static} W_{age} V_{slip})}{T_{static}}$ <br><br> $P(\text{Active}) = 1 - P(\text{Static})$ |
| Bit Hydraulics | $P(\text{Subideal}) = \dfrac{(\Sigma D_{sub} W_{age})}{T_{sub}}$ <br><br> $P(\text{Ideal}) = 1 - P(\text{Subideal})$ |
| Hole Angle | If(Angle < 20°){ <br> P(Low) = 1; P(High) = 0 <br> }elif(Angle > 55°){ <br> P(Low) = 0; P(High) = 1 <br> }else{ <br><br> $P(\text{Low}) = \dfrac{90° - \text{Angle}}{90°}$; $P(\text{High}) = 1 - \dfrac{90° - \text{Angle}}{90°}$ <br><br> } |
| Working Pipe | $P(\text{Frequent}) = \dfrac{N_{W,events}}{T_{working}}$ <br><br> $P(\text{Infrequent}) = 1 - P(\text{Frequent})$ |
| Rotating Pipe | $P(\text{Frequent}) = \dfrac{N_{R,events}}{T_{rotating}}$ <br><br> $P(\text{Infrequent}) = 1 - P(\text{Frequent})$ |
| Circulating No Drilling | $P(\text{Frequent}) = \dfrac{N_{CND,events}}{T_{CND}}$ <br><br> $P(\text{Infrequent}) = 1 - P(\text{Frequent})$ |

TABLE 3

Nomenclature

| Term | Meaning |
|---|---|
| $D_{suff}$ | Duration of sufficient circulation event |
| $D_{insuff}$ | Duration of insufficient circulation event |
| $D_{sub}$ | Duration of suboptimal bit hydraulics event |
| $D_{static}$ | Duration of static event |
| $N_{alert}$ | Number of weighted tight spot events detected: $N_{alert} = \Sigma w_{age}$ |
| $T_{tight}$ | Maximum threshold for number of tight spot events |
| $T_{sub}$ | Maximum threshold for total duration of sub-deal hydraulic events |
| $T_{static}$ | Maximum threshold for total duration of static hole events |
| $V_{slip}$ | Particle slip velocity for cuttings in laminar flow |
| $W_{age}$ | Weighting forage of each event: $1 - \dfrac{age}{2\ days}$ |
| $T_{working}$ | Maximum threshold for number of pipe-working events |
| $N_{w,events}$ | Number of weighted pipe-working events detected |
| $T_{rotating}$ | Maximum threshold for number of rotating events |
| $N_{R,events}$ | Number of weighted rotating events detected |
| $T_{CND}$ | Maximum threshold for number of circulating no drilling events |
| $N_{CND,events}$ | Number of weighted circulating no drilling events detected |

Table 4, below, describes the state definitions (i.e., a satisfactory state and an unsatisfactory state) for each of the nodes. The states can range from 0% to 100% based on currently-available information, and this is used to infer the hole cleaning efficiency. The node states are determined based on the probability mapping for each feature.

TABLE 4

Hole Cleaning Network Nodes and State Definitions

| Node | Node State Descriptions |
|---|---|
| Insufficient Circulation | Sufficient circulation means that the flow rate has consistently been rated high enough to transport cuttings along the wellbore. <br> Insufficient circulation means that the flow rate has consistently been rated too low to transport cuttings along the wellbore and accumulation is likely. |
| Tight Spot | Frequenttight spots indicate a high likelihood that something is impeding the drill string from tripping in/out of the hole. <br> Infrequent tight spots indicate a low likelihood that something is impeding the drill string from tripping in/out of the hole. |
| Static Hole | Static hole conditions mean that the drill string has either stopped moving or been out of the hole for an extended period. <br> Active hole conditions mean that the drill string is consistently drilling, circulating, or being moved through the wellbore. |
| Bit Hydraulics | Ideal hydraulics indicate that the hydraulic impact force being applied at the bit jets has consistently been in a sufficient range to push cuttings away from the bit. <br> Sub-ideal hydraulics indicate that the hydraulic impact for being applied at the bit jets has consistently been insufficient and is unlikely to be pushing away cuttings effectively. |
| Hole Angle | High angle hole indicates that the wellbore inclination angle is sufficiently deviated from vertical that it is impacting the other features. <br> Low angle hole indicates that the wellbore inclination angle is sufficiently close to vertical that it is not severely impacting the other features. |
| Working Pipe | Frequent working pipe indicates that a significant amount of pipe working has happened during the past several hours. <br> Infrequent working pipe indicates that there has not been a significant amount of pipe working during the past several hours. |
| Rotating Pipe | Frequent rotating pipe indicates that a significant amount of pipe rotation has happened during the past several hours. <br> Infrequent rotating pipe indicates that there has not been a significant amount of pipe rotation during the past several hours. |

TABLE 4-continued

Hole Cleaning Network Nodes and State Definitions

| Node | Node State Descriptions |
|---|---|
| Circulating No Drilling | Frequent circulating no drilling indicates that a significant amount of proactive circulation has happened during the past several hours. Infrequent circulating no drilling indicates that there has not been a significant amount of proactive circulation during the past several hours. |
| Hole Cleaning Efficiency | Efficient hole cleaning indicates that the features consistently suggest high-performance hole cleaning operations. Poor hole cleaning indicates that the features consistently suggest low-performance hole cleaning operations and that degrading conditions downhole may begin to impact tripping/drilling operations. |

The result of the probability mapping for each feature expresses the degree of influence the feature has on both the hole angle and the hole cleaning efficiency. Thus, with the probability mapping complete, the programming can infer hole cleaning efficiency at step 232 utilizing Bayesian networks. A Bayesian network is a type of probabilistic graphical model that uses Bayesian inference to compute probabilities. A Bayesian network captures the conditional dependence of features in a directed graph. This form of causal representation allows for probability calculations necessary to estimate the proposed hole cleaning efficiency. In other words, the Bayesian network can take an event that occurred, and predict the likelihood that one of several causes was the contributing factor. In this case, drilling efficiency can be estimated by observing several variables that are believed to affect drilling efficiency.

Figure 5:
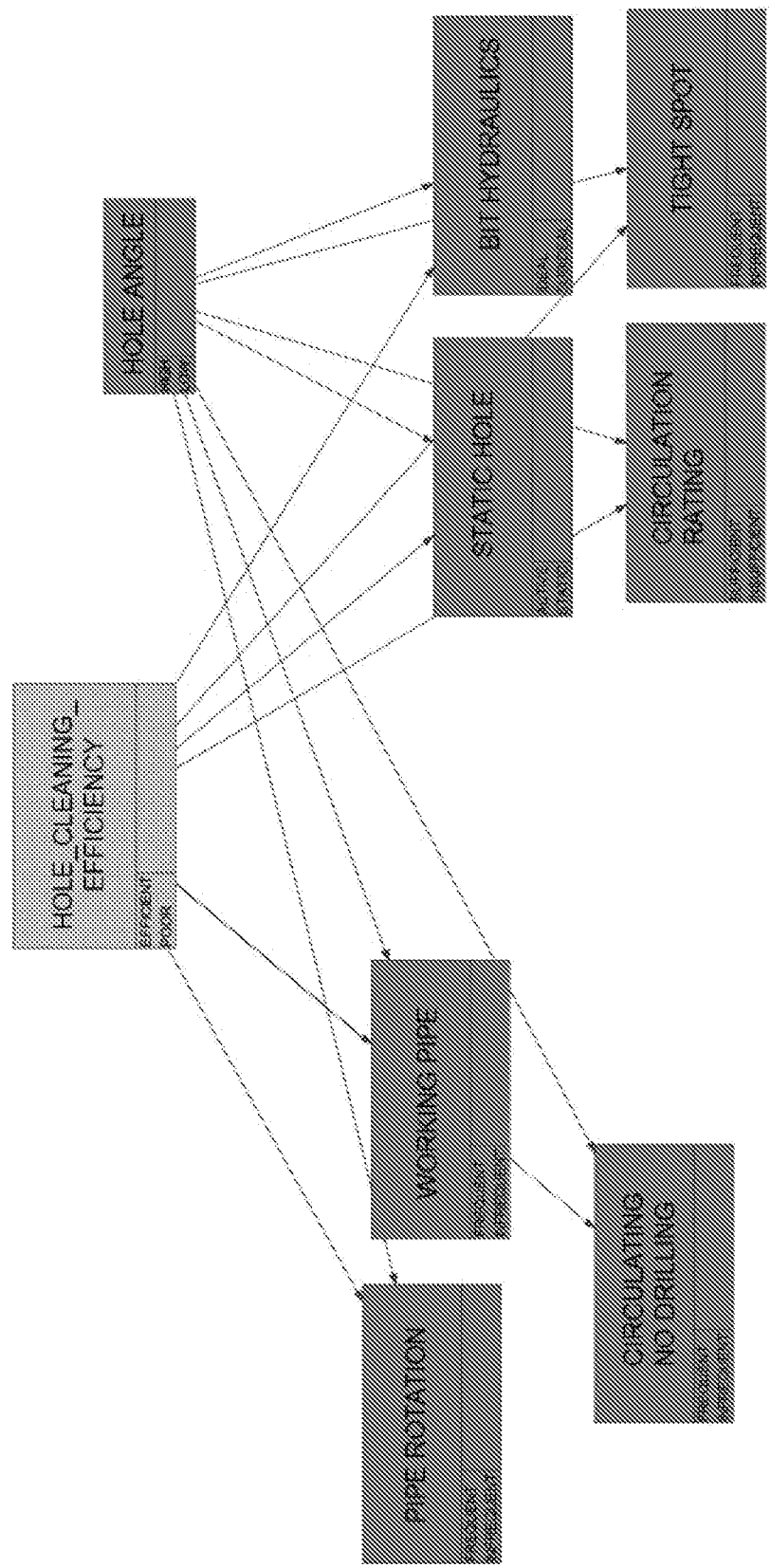
FIG. 5 is a graphical illustration of a Bayesian network of hole cleaning efficiency.

An exemplary Bayesian network representation utilized by the proposed method is illustrated in FIG. 5. The bottom seven nodes (described above in Table 1) represent long-horizon events that directly influence the hole cleaning efficiency belief. The upper-right node, "Hole Angle," indirectly impacts the hole cleaning belief through its influence on the bottom seven nodes. In other words, in the Bayesian network, even through the hole angle node is not directly connected to the hole cleaning node, the state of the hole angle affects the hole cleaning belief because of its effect on the features which are directly connected to the hole cleaning node. The following examples illustrate the inference of hole cleaning belief from the evidence seen in the network nodes.

Figure 6:
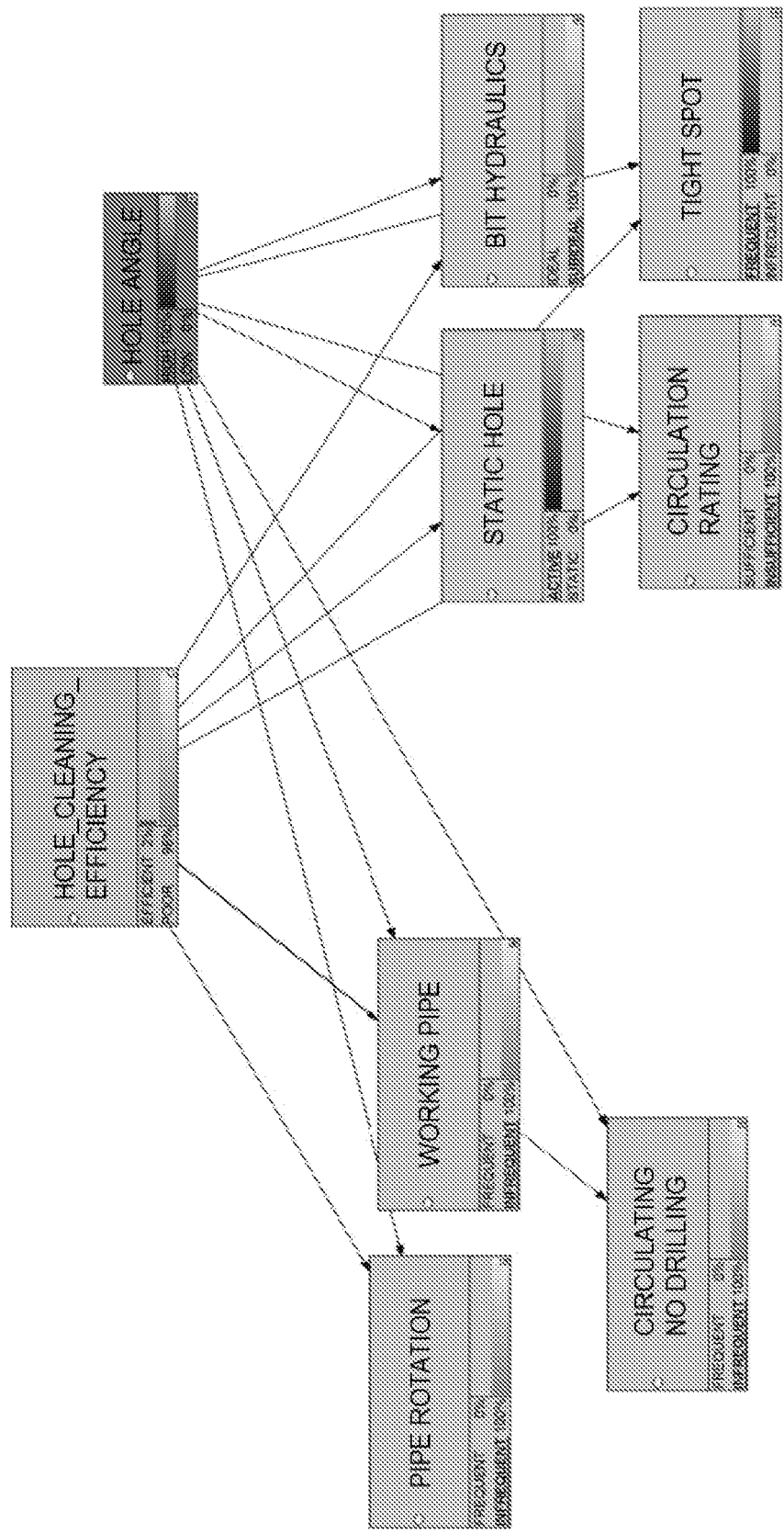
FIG. 6 is a graphical illustration of a Bayesian network of hole cleaning efficiency with low efficient belief.
Figure 7:
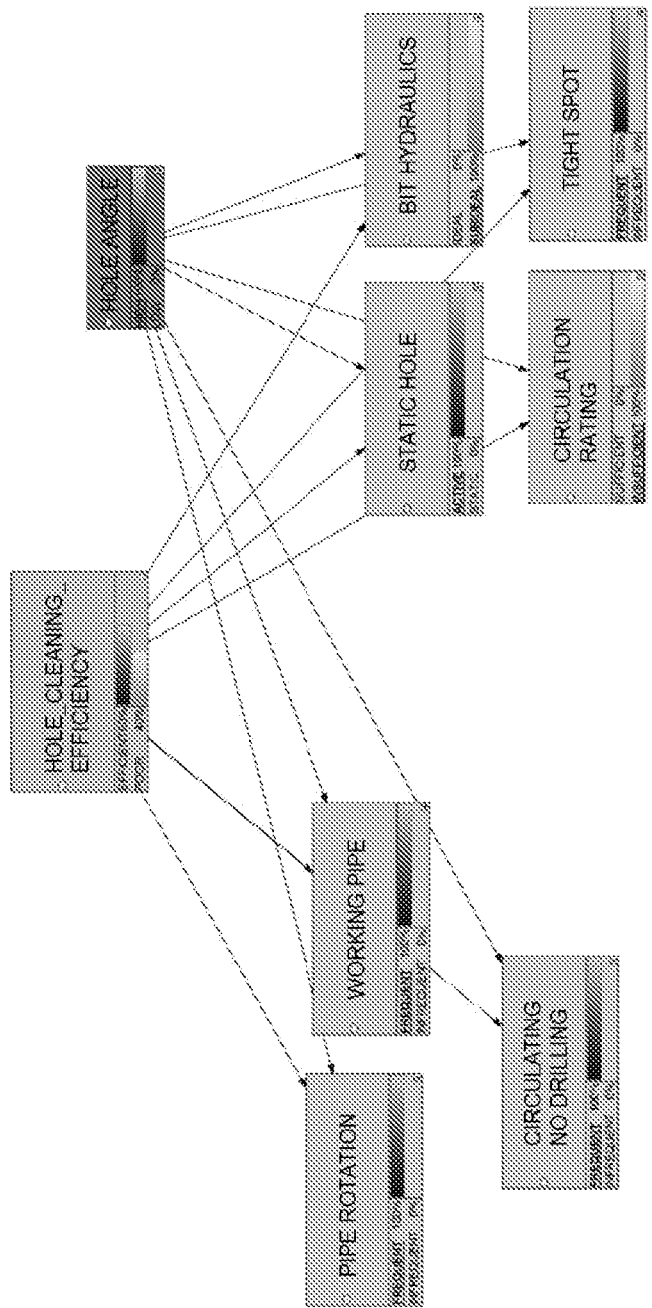
FIG. 7 is a graphical illustration of a Bayesian network with evidence of poor hole cleaning, but offset by proactive measures.
Figure 8:
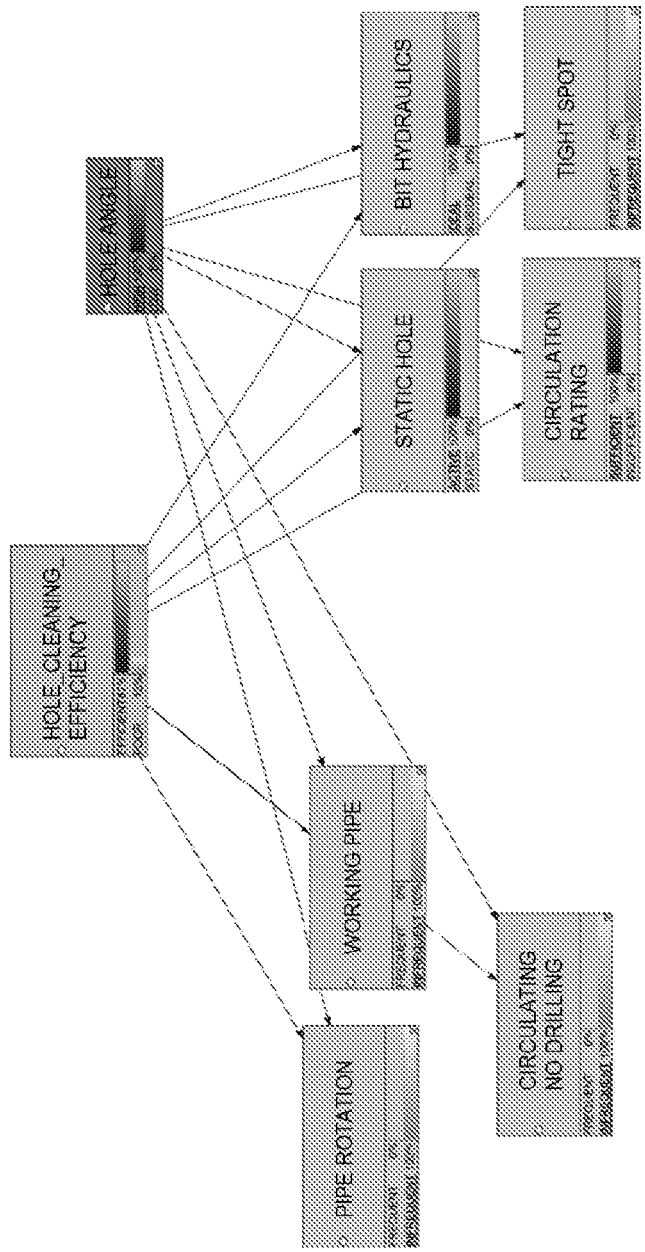
FIG. 8 is a graphical illustration of a Bayesian network of hole cleaning efficiency with high efficient belief.

Several specific but non-limiting examples are shown in FIGS. 6-8, which illustrate the inference of hole cleaning belief or efficiency from the evidence of the network nodes. In other words, the combination of node evidences is used to estimate whether the hole cleaning is efficient or poor.

In FIG. 6, the situation consists of a high angle hole where circulation has been consistently rated as insufficient and bit hydraulics are consistently below ideal levels. Even though the hole has been active, there is a belief that that cleaning has low efficiency (a low "efficiency" belief, or a high "poor" belief). This suggests a high probability that the hole cleaning practices have not been efficient and may result in issues going forward. There is a need to examine the circulating practices before continuing.

In FIG. 7, the situation is akin to the situation of FIG. 6. Here, however, there is evidence of considerable hole cleaning procedures relating to pipe rotation, working pipe, and circulating no drilling. As described in table 1, above, evidence of working pipe suggests that cuttings are being or have recently been dislodged which is expected to improve hole cleaning. Likewise, evidence of pipe rotation suggests that the cuttings are being dislodged as a result of the pipe rotation, thereby improving hole cleaning. And when fluid circulated without drilling, the circulation is intended to further clean the wellbore. Here, there is evidence of all three: pipe rotation, working pipe, and circulating no drilling. Therefore, the hole cleaning efficiency belief increases dramatically.

In FIG. 8, the situation consists of a high angle hole where circulation has been consistently rated as sufficient and bit hydraulics consistently above or at ideal levels. These factors, in combination with an active hole and infrequent tight spots lead to a high "efficient" belief in the hole cleaning efficiency node. In FIG. 8, it is noted that the pipe rotation, working pipe, and circulating no drilling nodes are all infrequent. However, this does not significantly reduce the hole cleaning belief. Rather, these proactive nodes improve the hole cleaning belief when evidence suggests that one or more of the hole cleaning procedures are frequent.

Once the inference of hole cleaning efficiency has been determined, the process may return to step 226 to repeat the hole cleaning efficiency analysis with any new data.

Figure 9:
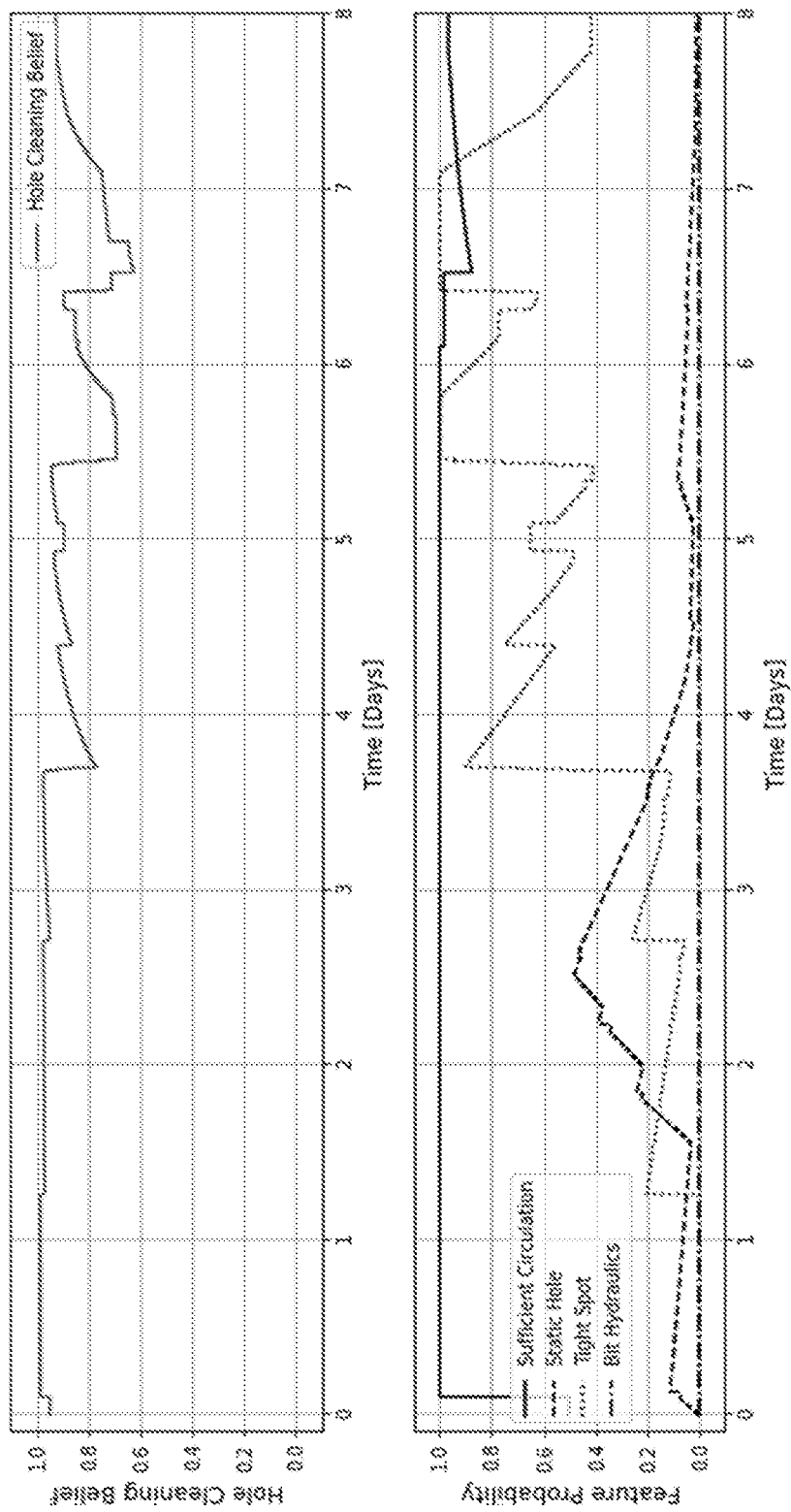
FIG. 9 is a graphical illustration of hole cleaning belief in a normal well.
Figure 10:
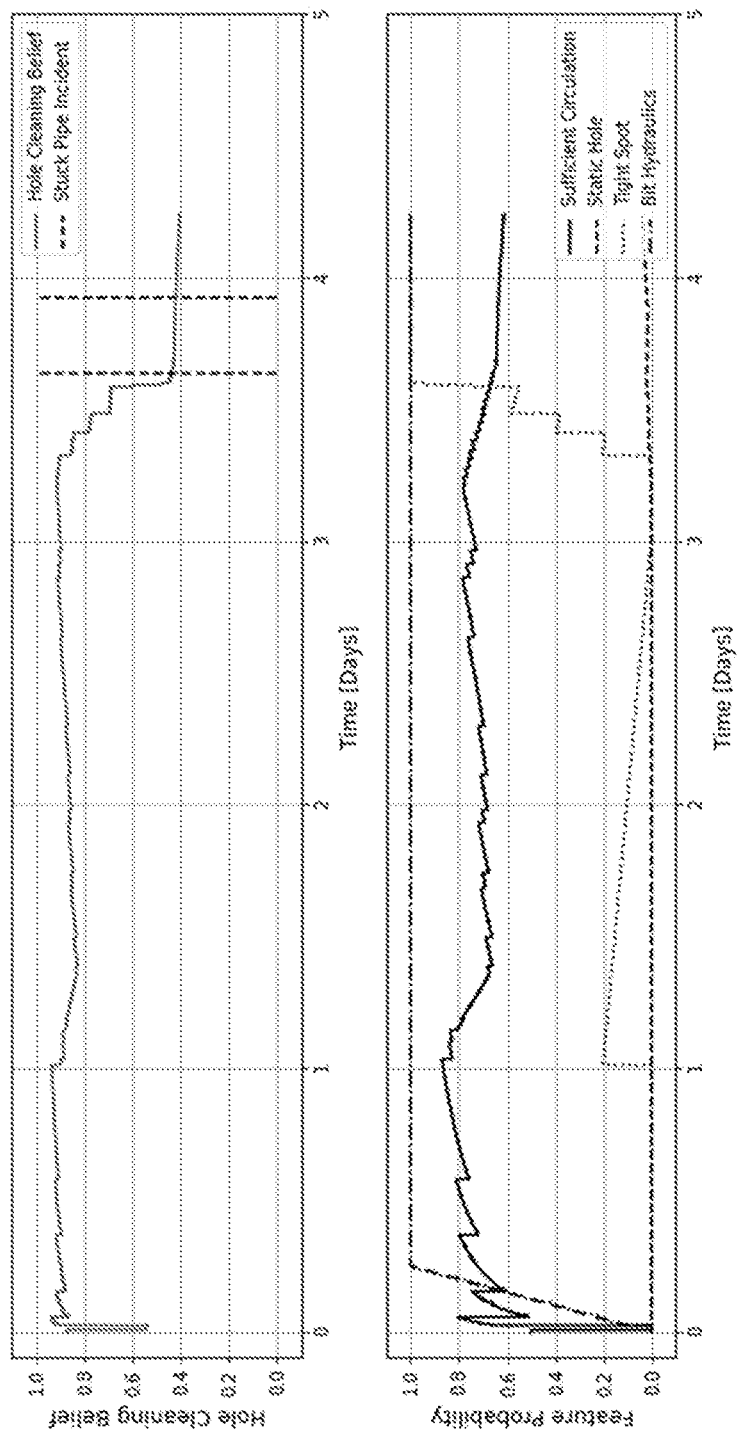
FIG. 10 is a graphical illustration of hole cleaning belief in a well exhibiting a stuck pipe incident.

Graphical representation of transient hole cleaning beliefs from two wells are shown in FIGS. 9 and 10. The plots shown in FIG. 9 are of a "normal" well operation with efficient hole cleaning. Under normal well operations, no hole cleaning related events were reported. Over the course of eight days, the sufficient circulation feature only dipped slightly once. This indicates that the circulating flow rate was consistently above the threshold for cuttings transport. The poor bit hydraulics feature remained at zero the entire time, meaning that during all the time spent circulating, there was always adequate hydraulic impact force applied at the bit. There was some time near the beginning of the operation where static hole conditions began to accumulate, but this died off and did not return. There were some tight spots near the end of the operation, but these were not sustained for a long period of time, and were likely due to factors other than hole cleaning. As a result of these factors, the belief that the hole cleaning was efficient remained high during the course of the operations.

On the other hand, the plots shown in FIG. 10 are of a well operation in which a stuck pipe incident was reported. The incident was believed to be mechanical in nature. Mechanical stuck pipe issues are related to drag and pack-off associated with poor hole cleaning. There is also the potential for chemical stuck pipe due to factors like wellbore swelling, but that is unrelated to hole cleaning. Over the first three days shown, the sufficient circulation feature never reached high levels and began to dip further as day 4 approached. This indicates that there was a non-negligible degree of insufficient circulation. The poor bit hydraulics saturated early and were maintained, meaning that during all the time spent circulating, there was always inadequate hydraulic impact force applied at the bit. There was a low static hole condition belief, but that does not have a strong impact on the overall hole cleaning belief. The tight spot feature began to grow approaching day the stuck pipe incident. This combination of features resulted in a low efficient hole cleaning belief leading up to the incident that reached a minimum near the time the stuck pipe incident was reported.

Because the estimated efficiency of hole cleaning can be monitored in real time during the drilling process, it may thus be possible to avoid and addresses certain circulating issues before or quickly after they arise.

Figure 11:
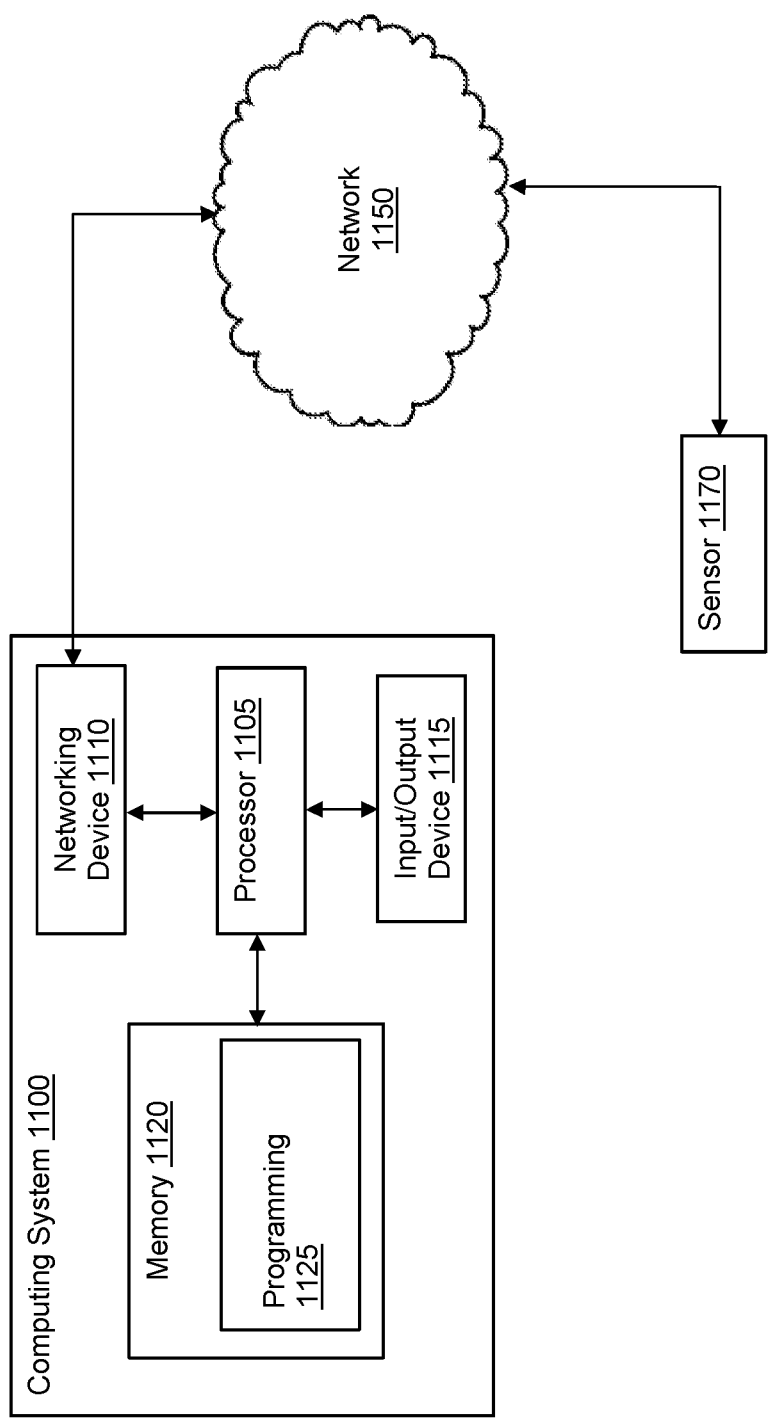
FIG. 11 is a block diagram of a computing system for executing the method according to embodiments of the invention.

The inventive method may be implemented as a computing system 1100, the components of which are illustrated in FIG. 11. The computing system 1100 may include a processor 1105 communicatively coupled to a networking device 1110, one or more input/output device 1115, and computer memory 1120. The processor 1105 may be configured through particularly configured hardware, such as an application specific integrated circuit (ASIC), field-programmable gate array (FPGA), etc., and/or through execution of software (e.g., program 1125) to perform functions in accordance with the disclosure herein.

Memory 1120 represents one or more of volatile memory (e.g., RAM) or non-volatile memory (e.g., ROM, FLASH, magnetic media, optical media, et cetera). Although shown within the computing system 1100 in FIG. 11, the memory 1120 may be, at least in part, implemented as network storage external to the computing system 1100 which may be accessed via the networking device 1110. The networking device 1110 may be implemented as one or both of a wired network interface and a wireless network interface (e.g., Wi-Fi, Internet, Bluetooth, etc.), as is known in the art.

The networking device 1110 may allow the computing system 1100 to communicate over a network 1150 with one or more sensors 1170. The network 1150 may be a wireless network, such as Wi-Fi, Bluetooth, or other wireless, or wired, network.

Program 1125 may be stored in a transitory or non-transitory portion of the memory 1120. Program 1125 includes machine readable instructions that, when executed by the processor 1105, perform one or more of the steps of the method described herein. In embodiments, as described above, the program 1125 may include instructions for receiving data from one or more of the sensors 1170 and determining the occurrence of one or more events that affect hole cleaning efficiency during drilling operations.

The data from the sensors 1170 may be stored in the memory 1120, or alternately may be stored in remote storage accessible over the network 1150. As described above, data, and specifically events determined from the data, may be logged as objects in the memory 1120.

The input/output device 1115 may include one or more input and/or output devices which may be embodied in a single device or multiple devices. In embodiments, the input/output device 1115 includes at least a monitor for display information to a user. The input/output device 1115 may additionally include a speaker, one or more buttons, a keyboard, mouse, et cetera. Importantly, the input/output device 1115 may allow the user to interact with the system 1100 for providing information (e.g., threshold conditions) to the system 1100 and receiving information therefrom.

Each of the sensors 1170 may include a processor, input/output device, networking device, et cetera. The networking device may allow the sensor 1170 to communicate over the network 1150 with the computing system 1100. In some embodiments, the sensor(s) are hard-wired to the computing system 1100 for providing data thereto. Of course, the sensors 1170 may be integral to the drilling equipment used to drill the wellbore. Alternately, the sensors 1170 may be placed at specific locations within the drilling operations, including but not limited to on the drilling equipment, for measuring and reporting conditions within and/or related to the wellbore (e.g., flow rates of drilling fluid pumped into the wellbore).

The components of the drilling system 1100 may be battery operated, solar powered, or may receive power by any other means now known or later developed.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. The specific configurations and contours set forth in the accompanying drawings are illustrative and non-limiting.

What is claimed is:

1. A system for monitoring the efficiency of hole cleaning of a well-bore during drilling operations, the system comprising a computing device comprising a processor in data communication with a plurality of sensors and computer memory, the computer memory comprising instructions that, when effected by the processor, perform the following steps:
   (a) receive, from at least one of the sensors, data relating to at least one feature for monitoring;
   (b) determine if the data from the at least one sensor meets a predetermined condition for the at least one feature;
   (c) if the data meets the predetermined condition, log an event, the event being associated with the at least one feature and having a time-stamp;
   (d) assign a weight to the event based on each of a frequency, a duration, and an age of the event;
   (e) determine a probability that the feature associated with the event exhibits a satisfactory state or an unsatisfactory state; and
   (f) estimate an efficiency of the well cleaning operations based on the probability of the feature.

2. The system of claim 1, wherein the processor further executes the following instructions:
   (g) determine a presence of at least one proactive hole cleaning procedure;
   wherein:
      step (g) occurs before step (f); and
      the estimation of the efficiency of the hole cleaning is further based on the presence of the at least one proactive hole cleaning procedure.

3. The system of claim 2, wherein the processor further executes the following instructions:
   (h) determine a hole angle of the well-bore;
   wherein the estimation of the efficiency of the hole cleaning is further based on the hole angle.

4. The system of claim 1, wherein the processor further executes the following instructions:
   (g) determine a hole angle of the well-bore;
   wherein the estimation of the efficiency of the hole cleaning is further based on the hole angle.

5. The system of claim 2, wherein:
   the at least one feature for monitoring is selected from the list consisting of: static hole, bit hydraulics, tight spot, and circulation rating;
   the at least one proactive hole cleaning procedure is selected from the list consisting of: pipe rotation, working pipe, and circulation no drilling.

6. The system of claim 1, wherein the at least one feature for monitoring is selected from the group consisting of: insufficient circulation, tight spot, and static hole.

7. The system of claim 1, wherein the at least one feature for monitoring includes at least one of insufficient circulation, tight spot, static hole, and bit hydraulics.

8. The system of claim 1, wherein the time-stamp includes a start time and an end time.

9. The system of claim 1, wherein the processor further executes the following instructions:
 (g) storing the event in computer memory as a JavaScript Object Notation (JSON) file.

\* \* \* \* \*